US008311102B2

(12) United States Patent
Lu et al.

(10) Patent No.: US 8,311,102 B2
(45) Date of Patent: Nov. 13, 2012

(54) BITSTREAM SWITCHING IN MULTIPLE BIT-RATE VIDEO STREAMING ENVIRONMENTS

(75) Inventors: Yan Lu, Beijing (CN); Feng Wu, Beijing (CN); Wen Sun, Anhui (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1456 days.

(21) Appl. No.: 11/460,217

(22) Filed: Jul. 26, 2006

(65) Prior Publication Data
US 2008/0046939 A1 Feb. 21, 2008

(51) Int. Cl.
*H04N 7/12* (2006.01)
(52) U.S. Cl. .................. 375/240.1; 375/240.24
(58) Field of Classification Search .............. 375/240.1, 375/240.24
See application file for complete search history.

(56) References Cited

U.S. PATENT DOCUMENTS

| 5,144,423 | A  | 9/1992  | Knauer et al.    |
|-----------|----|---------|------------------|
| 5,412,741 | A  | 5/1995  | Shapiro          |
| 5,719,632 | A  | 2/1998  | Hoang et al.     |
| 5,818,536 | A  | 10/1998 | Morris et al.    |
| 5,854,658 | A  | 12/1998 | Uz et al.        |
| 5,862,450 | A  | 1/1999  | Mandal et al.    |
| 6,018,303 | A  | 1/2000  | Sadeh            |
| 6,122,320 | A  | 9/2000  | Bellifemine et al. |
| 6,157,746 | A  | 12/2000 | Sodagar et al.   |
| 6,275,532 | B1 | 8/2001  | Hibi et al.      |
| 6,289,049 | B1 | 9/2001  | Kim et al.       |
| 6,498,810 | B1 | 12/2002 | Kim et al.       |
| 6,526,097 | B1 | 2/2003  | Sethuraman et al. |
| 6,542,549 | B1 | 4/2003  | Tan et al.       |
| 6,628,712 | B1 | 9/2003  | Le Maguet        |
| 6,717,990 | B1 | 4/2004  | Abousleman       |
| 6,735,249 | B1 | 5/2004  | Karczewicz et al. |
| 6,920,175 | B2 | 7/2005  | Karczewicz et al. |

(Continued)

FOREIGN PATENT DOCUMENTS
EP 0971542 1/2000
(Continued)

OTHER PUBLICATIONS

Aaron et al., "Compression with Side Information Using Turbo Codes", Proc. of Data Compression Conf (DCC 02), Apr. 2002, Utah, 10 pgs.

(Continued)

*Primary Examiner* — Jay Patel
*Assistant Examiner* — Richard Torrente
(74) *Attorney, Agent, or Firm* — Lee & Hayes, PLLC

(57) ABSTRACT

Bitstream switching for multiple bit rate video streaming uses a first algorithm to generate multiple encoded bitstreams of a piece of video at different bit rates. A different algorithm is used to generate multiple side bitstreams of the video. Each side stream is generated at respective ones of the different bit rates. The side bitstreams comprise switching frames to switch from a first bitstream encoded with the first algorithm at a first bit rate to a second bitstream encoded with the first algorithm at a different bit rate. At non-bitstream switching points, frames from respective ones of bitstreams generated with the first algorithm are streamed for presentation. At a bitstream switching point, a switching frame from a respective side bitstream is transmitted to a decoder to transition streaming from a first of the respective ones of the bitstreams to a second of the respective ones of the bitstreams.

18 Claims, 7 Drawing Sheets

U.S. PATENT DOCUMENTS

| | | | |
|---|---|---|---|
| 6,947,486 | B2 | 9/2005 | Akhan et al. |
| 7,003,035 | B2 | 2/2006 | Tourapis et al. |
| 7,031,389 | B2 | 4/2006 | Guevorkian et al. |
| 7,233,269 | B1 | 6/2007 | Chen et al. |
| 7,256,716 | B2 | 8/2007 | Liu et al. |
| 7,418,037 | B1 | 8/2008 | Nie et al. |
| 2003/0123540 | A1 | 7/2003 | Zhong et al. |
| 2003/0151753 | A1 | 8/2003 | Li et al. |
| 2003/0156644 | A1 | 8/2003 | Song et al. |
| 2004/0039571 | A1 | 2/2004 | Bruekers et al. |
| 2004/0114684 | A1* | 6/2004 | Karczewicz et al. .... 375/240.03 |
| 2004/0172478 | A1 | 9/2004 | Jacobs et al. |
| 2005/0013371 | A1 | 1/2005 | Yim et al. |
| 2005/0024487 | A1 | 2/2005 | Chen |
| 2005/0036550 | A1 | 2/2005 | Koba et al. |
| 2005/0047508 | A1 | 3/2005 | Ha et al. |
| 2005/0084014 | A1 | 4/2005 | Wang et al. |
| 2005/0105815 | A1 | 5/2005 | Zhang et al. |
| 2005/0201468 | A1 | 9/2005 | Tsai et al. |
| 2005/0232360 | A1 | 10/2005 | Byun |
| 2005/0268200 | A1 | 12/2005 | Garudadri et al. |
| 2006/0008006 | A1 | 1/2006 | Cha et al. |
| 2006/0062299 | A1 | 3/2006 | Park et al. |
| 2006/0072662 | A1 | 4/2006 | Tourapis et al. |
| 2006/0197686 | A1 | 9/2006 | Liu et al. |
| 2006/0197690 | A1 | 9/2006 | Liu et al. |
| 2006/0200733 | A1 | 9/2006 | Stankovic et al. |
| 2007/0013561 | A1 | 1/2007 | Xu et al. |
| 2007/0014356 | A1 | 1/2007 | Han et al. |
| 2007/0041652 | A1 | 2/2007 | Budge et al. |
| 2007/0133690 | A1 | 6/2007 | Xin et al. |
| 2007/0165717 | A1 | 7/2007 | Ye |
| 2007/0217541 | A1 | 9/2007 | Liu et al. |
| 2008/0189073 | A1 | 8/2008 | Jagmohan et al. |
| 2008/0219351 | A1 | 9/2008 | Kim et al. |

FOREIGN PATENT DOCUMENTS

| | | | |
|---|---|---|---|
| WO | WO2005043882 | A2 | 5/2005 |

OTHER PUBLICATIONS

Aaron, et al., "Transform-domain Wyner-Ziv Codec for Video", available at least as early as Jun. 4, 2007, at <<http://citeseer.ist.psu.edu/cache/papers/cs/31531/http:zSzzSzwww.stanford.eduzSz~bgirodzSzpdfszSzAaronVCIP04.pdf/transform-domain-wyner-ziv.pdf>>, 9 pgs.

Aaron et al., "Wyner-Ziv Coding of Motion Video", Proc. Asilomar Conf on Signals and Systems, California, Nov. 2002, 5 pgs.

Aaron, et al., "Wyner-Ziv Video Coding with Hash-Based Motion Compensation at the Receiver", International Conference on Image Processing (CIP), 2004, pp. 3097-3100.

Adikari, et al., "Side Information Improvement in DVC with Two Side Information Streams and 3D Motion Refinement," retrieved at <<http://ieeexplore.ieee.org/iel5/4232658/4232659/04232674.pdf?isnumber=4232659&prod=CNF&arnumber=4232674&arSt=32&ared=35&arAuthor=Adikari%2C+A.+B.+B.%3B+Fernando%2C+W.+A.+C.%3B+Weerakkody%2C+W.+A.+ R.+J.&htry=1>>, IEEE, 2007, pp. 32-35.

Barron, et al., "The Duality Between Information Embedding and Source Coding with Side Information and Some Applications", available at least as early as Jun. 4, 2007, retrieved at <<http://allegro.mit.edu/pubs/posted/journal/2003-barron-chen-wornell-it.pdf>>, IEEE Transactions on Information Theory, vol. 49, No. 5, May 2003, pp. 1159-1180.

Berrou, et al., "Near Shannon Limit Error-Correcting Coding and Decoding:Turbo-Codes (1)", Proc. IEEE International Conference on Communications, Geneva, Switzerland, May 1993, pp. 1064-1070.

Chen et al., "Fast Integer Pel and Fractional Pel Motion Estimation for JVT", JVT-FO17, 6th Mtg, Japan, Dec. 2002, 14 pgs.

Chen et al, "Rate Control for Streaming Video over Wireless", Proc. INFOCOM 2004, Hong Kong, China, Mar. 2004, 6 pgs.

Dalai, et al., "Improving Turbo Codec Integration in Pixel-Domain Distributed Video Coding," available at least as early as Nov. 5, 2007, at <<http://www.discoverdvc.org/publications/IST/DLP_ICASSP06.pdf>>, 4 pgs.

Divsalar, et al., "Multiple Trellis Coded Modulation (MTCM)," IEEE Transactions on Communications, vol. 36, No. 4, Apr. 1988, pp. 410-419.

Guo et al., "Dependency Modeling in Multiple Bit-Rate Video Streaming Using Wyner-Ziv Coding", ICIP, 2006, 5 pgs.

Guo et al, "Free Viewpoint Switching in Multi-View Video Streaming Using Wyner-Ziv Video Coding", SPIE Visual Communications and Image Processing, Jan. 2006, 8 pgs.

He et al., "Power-Rate-Distortion Analysis for Wireless Video Communication under Energy Constraints", IEEE Trans. on Circuits and Systems for Video Technology, vol. 15, May 2005, 13 pgs.

Karczewicz et al., "The SP- and SI-Frames Design for H.264/AVC", IEEE Trans. on Circuits and Systems for Video Technology, vol. 13, No. 7, Jul. 2003, 8 pgs.

Liu, et al., "Wyner-Ziv Video Coding Using LDPC Codes", IEEE, 2006, pp. 258-261.

Martucci et al., "Zerotree Entropy Coding of Wavelet Coefficients for Very Low Bit Rate Video", ICIP 1996, Swizerland, Sep. 1996, 4 pgs.

Pradhan et al., "Distributed Source Coding Using Syndromes (DISCUS): Design and Construction", IEEE Trans. on Information Theory, vol. 49, No. 3, Mar. 2003, 18 pgs.

Pu et al., "Joint Power-Distortion Optimization on Devices with MPEG-4 AVC/H.264 Codec", Proc. ICC 2006, Turkey, Jun. 2006, 6 pgs.

Puri et al., "PRISM: A New Robust Video Coding Architecture Based on Distributed Compression Principles", Proc. 40th Allerton Conf on Communication, Control, and Computing, Illinois, Oct. 2002, 10 pgs.

Puri et al., "PRISM: A Reversed Multimedia Coding Paradigm", IEEE Int. Conf. Image Processing, Spain, 2003, 4 pgs.

Rowitch et al., "On the Performance of Hybrid FEC/ARQ Systems Using Rate Compatible Punctured Turbo (RCPT) Codes", IEEE Trans. on Communications, vol. 48, No. 6, Jun. 2000, 12 pgs.

Slepian, et al., "Noiseless Coding of Correlated Information Sources", IEEE Transactions on Information Theory, vol. IT-19, No. 4, Jul. 1973, pp. 471-480.

"Source Coding", http://www.irisa.fr/temics/research/coding.php, printed on Apr. 25, 2006, 6 pages.

Sun et al., "The Improved SP Frame Coding Technique for the JVT Standard", Proc. IEEE ICIP 2003, vol. 3, Spain, Sep. 2003, 4 pgs.

Vleeschouwer, et al., "Motion Estimation for Low Power Video Devices", IEEE, 2001, pp. 953-956.

Westerlaken, et al., "Turbo-Code Based Wyner-Ziv Video Compression", available at least as early as Jun. 4, 2007, at <<http://ict.ewi.tudelft.nl/pub/ronald/RPWesterlakenWic2005.pdf>>, 8 pgs.

Wiegand et al., "Overview of the H.264/AVC Video Coding Standard", IEEE Trans. on Circuits and Systems for Video Technology, vol. 13, No. 7, Jul. 2003, 19 pgs.

Wu, et al., "Multiple Description Image Coding with Distributed Source Coding and Side Information", SPIE Multimedia Systems and Applications VII, Mitsubishi Electric Research Laboratories, Inc., Dec. 2004, 10 pages.

Wyner, et al., "The Rate-Distortion Function for Source Coding with Side Information at the Decoder", IEEE Transactions on Information Theory, vol. IT-22, No. 1, Jan. 1976, pp. 1-10.

Yang et al., "A Framework for Fine-Granular Computational-Compleity Scalable Motion Estimation", Proc. IEEE, ISCAS 2005, vol. 6, May 2005, 4 pgs.

Yang, et al., "Wyner-Ziv Coding Based on TCQ and LDPC Codes", IEEE, 2003, pp. 825-829.

Zamir, et al., "Nested Linear/Lattice Codes for Structured Multiterminal Binning", IEEE Transactions on Information Theory, vol. 48, No. 6, Jun. 2002, pp. 1250-1276.

Zhao, et al., "Computational Complexity Management of Motion Estimation in Video Encoders", Proceedings of the Data Compression Conference, IEEE, 2002, 1 page.

Adikari, et all, "A Sequential Motion Compensation Refinement Technique for Distributed Video Coding of Wyner-Ziv Frames", Image Processing, 2006 IEEE International Conference: iEEE Cot. 2006, pp. 597-600.

Akikari, et al., "Wyner-Ziv Coding with Temporal and Spatial Correlations for Motion Video", Electrical and Computer Engineering, 2006, CCECE 2006, IEEE May 2006, pp. 1188-1191.

Aaron, et al., "Towards Practical Wyner-Ziv Coding of Video", Proceedings of the 2003 International Conference on Image Processing (ICIP2003), Nov. 2003, pp. III 869-872.

Artigas, et al., "A Model-Based Enhanced Approach to Distributed Video Coding", Image Analysis for Multimedia Interactive Services (WIAMIS), Apr. 2005, 4 pages.

Fowler, et al., "Wavelet-based Distributed Source Coding of Video", Proceedings of the 13th European Signal Processing Conference (EURASIP), Sep. 2005, 4 pages.

Girod, et al., "Distributed Video Coding", Proc. IEEE, Special Issue on Advances in Video Coding and Delivery, Jun. 2005, 12 pages.

Sun et al., "Efficient and Flexible Drift-Free Video Bitstream Switching at Predictive Frames", Proceedings from the 2002 IEEE International Conference on Multimedia Expo (ICME '02), Nov. 2002, 4 pages.

Sun et al., "Seamless Switching of Scalable Video Bitstreams for Efficient Streaming", IEEE Transactions on Multimedia, vol. 6, No. 2, Apr. 2004, pp. 291-303.

Wang, et al., "Wzs: Wyner-Ziv Scalable Predictive Video Coding", Proceedings of Picture Coding Symposium (PCS '04), Dec. 2004, 6 pages.

Yang, et al., "Adaptive Key Frame Selection Wyner-Ziv Video Coding", 2005 IEEE 7th Workshop on Multimedia Signal Processing, Nov. 2006, 4 pages.

Zhao, et al., "Complexity Management for Video Encoders", ACM Multimedia Conference, Dec. 2002, 3 pages.

Final Office Action for U.S. Appl. No. 11/457,705, mailed on May 19, 2011, Yan Lu, "Encoding Visual Data with Computation Scheduling and Allocation", 13 pages.

Non-Final Office Action for U.S. Appl. No. 11/462,580, mailed on Jun. 21, 2011, Yan Lu, "Wyner-Ziv and Wavelet Video Coding", 18 pages.

Office Action for U.S. Appl. No. 12/047,317, mailed on Oct. 18, 2011, Yan Lu, "Wyner-Ziv Coding with Multiple Side Information", 9 pgs.

Office Action for U.S. Appl. No. 11/462,580, mailed on Nov. 9, 2011, Yan Lu, "Wyner-Ziv and Wavelet Video Coding ", 13 pgs.

Office Action for U.S. Appl. No. 11/457,705, mailed on Apr. 18, 2012, Yan Lu, "Encoding Visual Data with Computation Scheduling and Allocation", 12 pgs.

\* cited by examiner

BITSTREAM SWITCHING IN MULTIPLE BIT-RATE VIDEO STREAMING ENVIRONMENTS

BACKGROUND

Existing video streaming applications attempt to provide end users with consistent high quality video streaming. In the presence of network bandwidth variations, this becomes more challenging. Applications that implement multiple bit-rates (MBR) video streaming strive to provide such high quality services by encoding a same video source multiple times at different respective bit-rates. During video streaming operations, an MBR video streaming server or receiver dynamically selects and switches to the bitstream encoded at the proper bit rate in view of current network data throughput conditions to accommodate for bandwidth variations. However, if the bitstreams are switched at an inter-coded P-frame, the switching operations generally introduce drift errors into the resulting video stream, causing reduced video quality. If intra-coded bitstreams are used to switch from one bitstream to another coding efficiency is typically adversely effected (the more intra-coded frames, the less coding efficiency).

To provide "drift(error)-less" bitstream switching, existing MBR video streaming applications may replace original frames of the non-encoded media content with predefined switching frames (e.g. the SP frames in H.264) during encoding operations. Then, based on network bandwidth conditions, the server switches bitstreams at one of these predefined inserted frames. However, replacing normally coded frames (i.e. the inter-coded P-frames) with specially designed switching frames lowers coding efficiency. Moreover, such switching frame replacement operations require data exchange from respective ones of the multiple bitstreams. Thus, in an MBR streaming environment that replaces original frames with predefined switching frames, bitstreams cannot be encoded independent of one or more different bitstreams. Rather, each bitstream is jointly encoded with at least one different bitstream. This increases complexity of the encoding operations. Furthermore, systems that replace normal frames with special switching frames typically fail responsive to transmission errors between the streaming server and receiving device.

SUMMARY

Bitstream switching for multiple bit rate video streaming uses a first algorithm to generate multiple encoded bitstreams of a piece of video at different bit rates. A different algorithm is used to generate multiple side bitstreams of the video. Each side stream is generated at respective ones of the different bit rates. The side bitstreams comprise switching frames to switch from a first bitstream encoded with the first algorithm at a first bit rate to a second bitstream encoded with the first algorithm at a different bit rate. At non-bitstream switching points, frames from respective ones of bitstreams generated with the first algorithm are streamed for presentation. At a bitstream switching point, a switching frame from a respective side bitstream is transmitted to a decoder to transition streaming from a first of the respective ones of the bitstreams to a second of the respective ones of the bitstreams.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

There are no existing Wyner-Ziv bitstream switching schemes. Existing Wyner-Ziv coding (not switching) schemes encode entire videos. Such coding schemes have very low coding efficiency and are generally considered unsuitable for non-MBR and MBR video streaming scenarios. In contrast to such existing schemes, systems and methods for bitstream switching in multiple bit-rate (MBR) streaming environments are presented below in reference to FIGS. 1-8. The systems and methods provide a framework for using Wyner-Ziv coding and turbo codes only at a bitstream switching point to allow a decoder to generate robust high-quality side information when reconstructing a switched-in frame at the switching (transition) point for presentation to a user. At non-switching points, regularly encoded frames (i.e., non-Wyner-Ziv frames) are streamed to a client device for decoding and video presentation in MBR streaming environments. These and other aspects of the systems for bitstream switching in MBR video streaming environments are now described in greater detail.

An Exemplary System

Although not required, systems and methods for bitstream switching in MBR video streaming environments are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
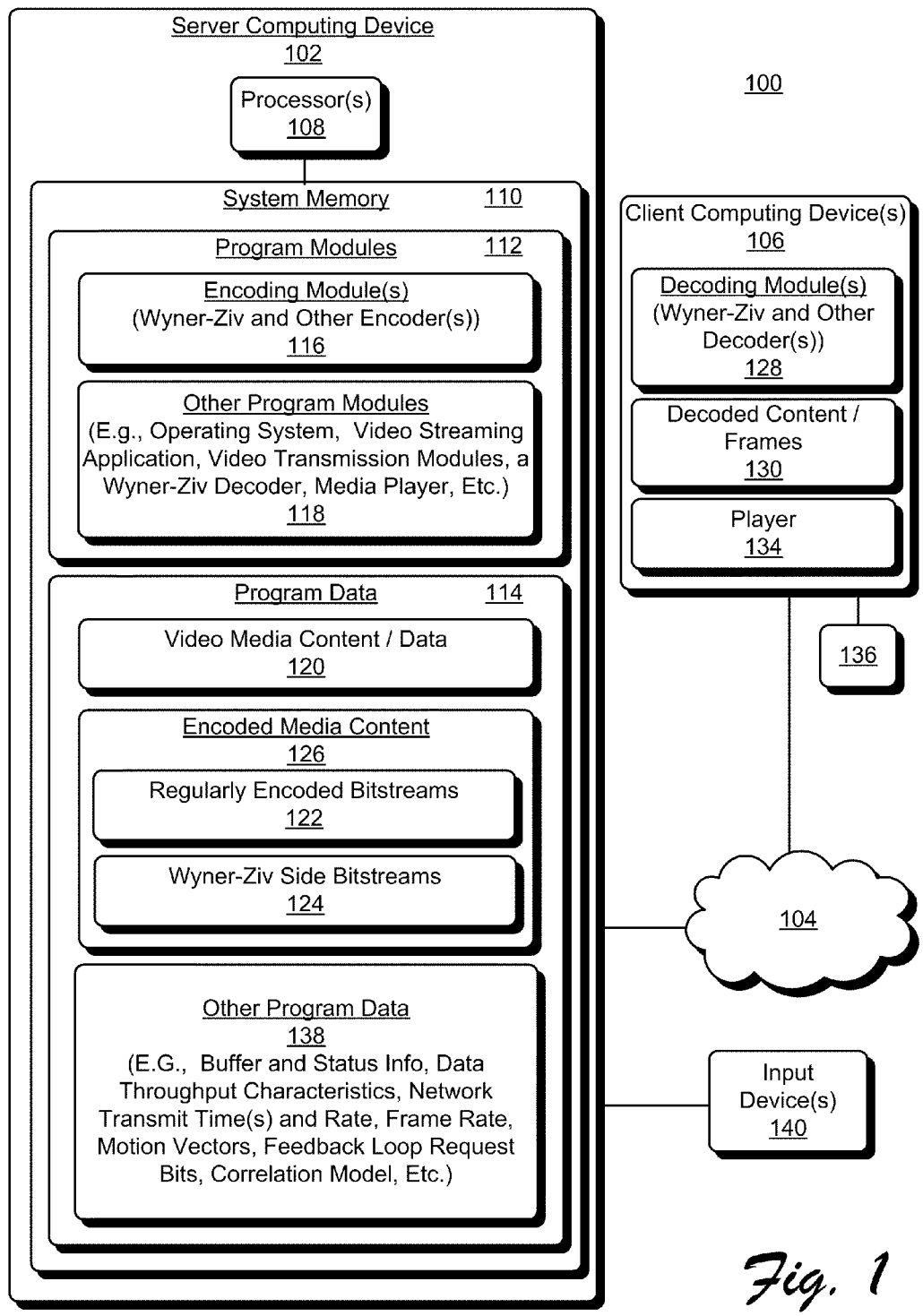
FIG. 1 shows an exemplary system for bitstream switching in MBR video streaming environments, according to one embodiment.

FIG. 1 shows an exemplary system 100 for bitstream switching in MBR video streaming environments, according to one embodiment. System 100 includes a server-computing device ("server") 102 coupled across a network 104 to one or more client computing devices ("client") 106. Server 102 and/or client 106 may be for example a general purpose computing device, a server, a laptop, a mobile computing device, and/or so on. Network 104 may include any combination of a local area network (LAN) and a general wide area network (WAN) communication environments, such as those which are commonplace in offices, enterprise-wide computer networks, intranets, and the Internet. Server 102 and client 106 include one or more respective processors coupled to a system memory comprising computer-program modules and program data. Each respective processor is configured to fetch and execute computer-program instructions from respective ones of the computer-program modules and obtain data from program data.

For example, server 102 includes processor 108 coupled to system memory 110. Processor 108 may be a microprocessor, microcomputer, microcontroller, digital signal processor, etc. System memory 110 includes, for example, volatile random access memory (e.g., RAM) and non-volatile read-only memory (e.g., ROM, flash memory, etc.). System memory 110 comprises program modules 112 and program data 114. Program modules 112 include, for example, encoding modules ("encoder") 116 and "other program modules" 118 such as an Operating System (OS) to provide a runtime environment, a video streaming application that leverages operations of encoder 116, bitstream transmission modules, a conventional and a Wyner-Ziv decoder, a media player, device drivers, and/or so on.

Encoder 116 includes, for example a conventional encoder (e.g., an H.264 encoder) and a Wyner-Ziv encoder. For input signal X (i.e., video data 120), a conventional video encoder produces multiple streams of regular encoded media content 122. Each regularly encoded stream of encoded media content is generated from a same piece of video data 120 and encoded according to a different respective bit transmit rate. The Wyner-Ziv encoding portion of encoder 116 implements any known Wyner-Ziv encoding scheme to produce multiple side streams 124 of encoded media content (i.e., Wyner-Ziv bits) corresponding to the multiple regularly encoded streams. These multiple side streams are also shown as respective portions of encoded media content 126. Each side stream is composed of switching frames; one switching frame per frame of the piece of media content. That is, for at least a subset of frame(s) of X, the Wyner-Ziv encoder produces Wyner-Ziv bits for a respective correlation frame Y for the encoding of X at a bitstream switching point at time n (the time corresponds to a time in a video presentation timeline). These Wyner-Ziv bits are generated independent of any side information frame that will subsequently be generated by client 106 to obtain a target quality for a finally decoded frame.

Encoder 116 (or a video streaming application leveraging operations of encoder 116) communicates frames of the regularly encoded streams 122 to client 106. (Exemplary video transmission module(s) are shown as respective portions of "other program modules" 118). Responsive to receiving frames from a regularly encoded bitstream 122, decoder 128 utilizes a conventional decoder to decode the encoded frames to generate respective portions of decoded content/frames 130). During media content streaming operations, and responsive to determining that bandwidth considerations of network 104 dictate that a first regular encoded bitstream 122 being streamed to client 106 should be switched-out with a different regular coded bitstream 122, encoder 116 transmits a corresponding Wyner-Ziv switching frame (i.e., Wyner-Ziv parity bits) from the side bitstream 124 corresponding to the bitstream 122 being switched-out. The switch-point occurs at time instant n.

In one implementation, responsive to receiving the Wyner-Ziv bits (frame X) from encoder 116, decoder 128 utilizes the Wyner-Ziv portion of decoder 128 to decode the Wyner-Ziv bits and reconstruct a frame X' of the different regular coded bitstream 122. For example, the received Wyner-Ziv bits and signal Y side information (determined via a conventional request bits feedback loop between decoder 128 and encoder 116) are jointly utilized to decode and output the reconstruction of X, which is represented as X'. At the client, decoded content/frames are presented to a user by media player 132 via display device 134.

Figure 2:
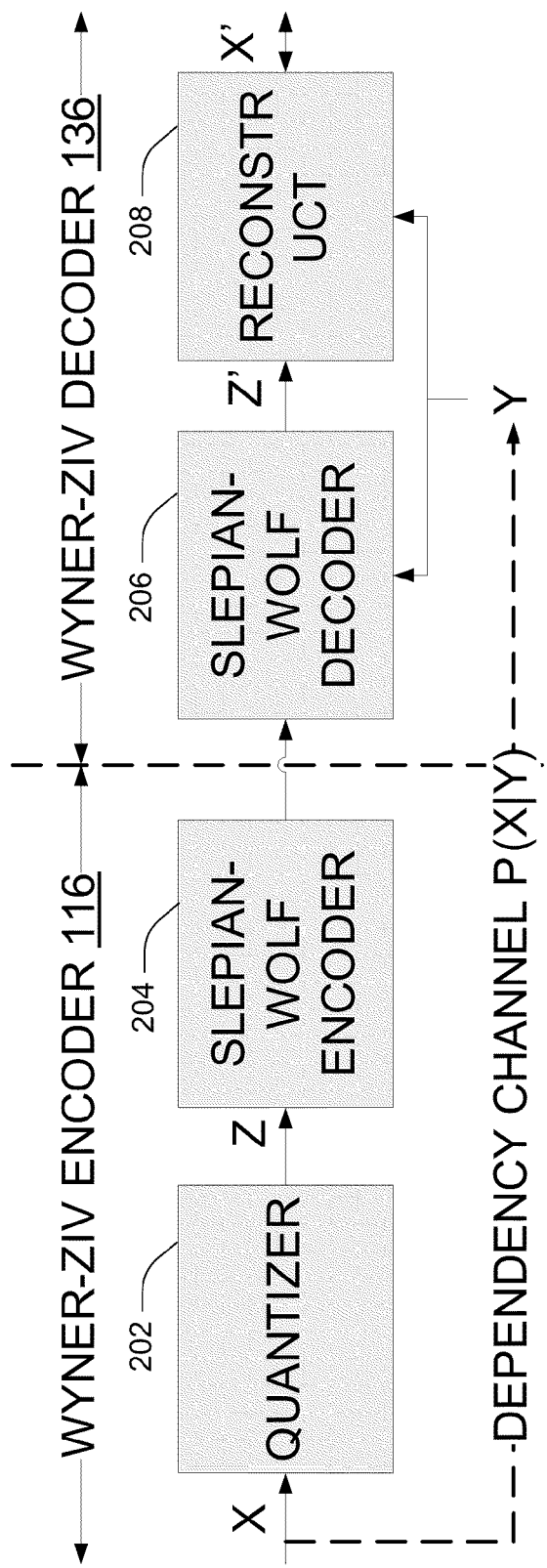
FIG. 2 shows an exemplary Wyner-Ziv encoder and decoder (i.e., Wyner-Ziv codec), according to one embodiment.

FIG. 2 shows an exemplary Wyner-Ziv encoder portion of encoder module(s) 116 and Wyner-Ziv decoder portion of decoder module(s) 128 (i.e., codec) of FIG. 1, according to one embodiment. In particular, quantizer 202 quantizes X into Z and sends it to Slepian-Wolf Encoder 204 for lossless encoding. Slepian-Wolf Decoder 206 decodes Z with side information Y and the parity bits generated by encoder 204. Reconstructor 208 performs inverse quantization with Y and outputs X'.

Exemplary Operations for Bitstream Switching

In Wyner-Ziv encoding, two correlated signals can be encoded separately, but decoded conditionally. In this implementation, the Wyner-Ziv portion of encoder module(s) 116 implements a turbo code based Wyner-Ziv encoding scheme to facilitate bitstream switching at any desired frame without affecting coding efficiency of regularly transmitted bitstreams. (Although turbo code encoding is known, the described bitstream-switching scheme using Wyner-Ziv bits is novel). Additionally, for any one frame, turbo code based Wyner-Ziv encoding provides for use of a same embedded Wyner-Ziv bitstream for the switching from any other bitstream to the current bitstream.

When server 102 switches between the first bitstream 126 and the second bitstream 126, server 102 transmits only part of the Wyner-Ziv bits in terms of switching point to decoder 128. This partial number of bits provide enough information to correct the errors in the side information generated by decoder 128 using a conventional request-bits feedback loop to generate a good reference frame. In view of this framework, and in this implementation, encoding module(s) 116 implements at least two bitstream switching schemes for MBR video streaming. Before describing these exemplary bitstream-switching schemes, aspects of two exemplary media content encoded bitstreams are described.

Figure 3:
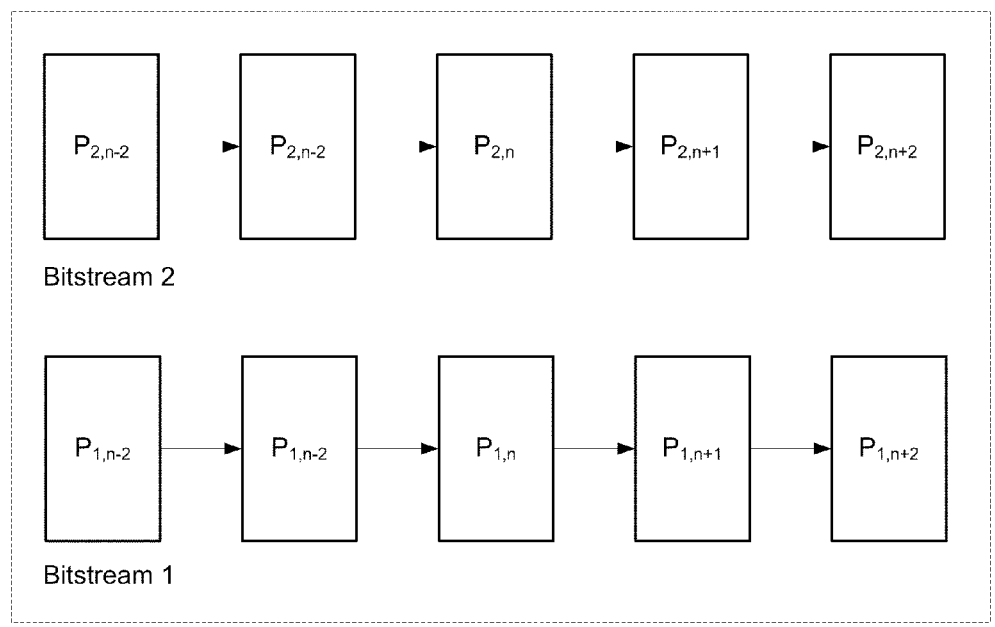
FIG. 3 shows two exemplary encoded bitstreams of media content, according to one embodiment.

FIG. 3 shows two exemplary encoded bitstreams of media content, according to one embodiment. Aspects of FIG. 3 are described with respect to components of FIG. 1. In the description, a leftmost reference numeral of a component indicates the particular figure where the component was first introduced. For example, the two bitstreams of FIG. 3 represent respective portions of encoded media content 126 of FIG. 1. Referring to FIG. 3 bitstream 1 represents a lower bit rate encoding of video data 120 and bitstream 2 represents a higher bit rate encoding of the same video data 120. Predictive frames $P_{1,n-2}, P_{1,n-1}, \ldots, P_{1,n+2}$, and $P_{2,n-2}, P_{2,n-1}, \ldots, P_{2,n+2}$ represent temporally consecutive frames of the two bitstreams, respectively. More particularly, $P_{k,n}$ (k=1, 2) represents the coded bits of frame n in bitstream k. The arrows indicate motion prediction directions. Additionally, for purposes of exemplary illustration, $F_{1,n-2}, F_{1,n-1}, \ldots, F_{1,n+2}$, and $F_{2,n-2}, F_{2,n-1}, \ldots, F_{2,n+2}$ denote reconstructed frames (not shown) of the two bitstreams at a decoder 128, respectively. In other words, $F_{k,n}$ (k=1, 2) indicates the reconstructed frame in bitstream k at decoder 128. In view of bitstreams 1 and 2 of FIG. 3, we now refer to FIGS. 4 and 5 to describe two respective exemplary bitstream switching schemes for MBR video streaming.

A First Exempla Bitstream Switching Scheme

Figure 4:
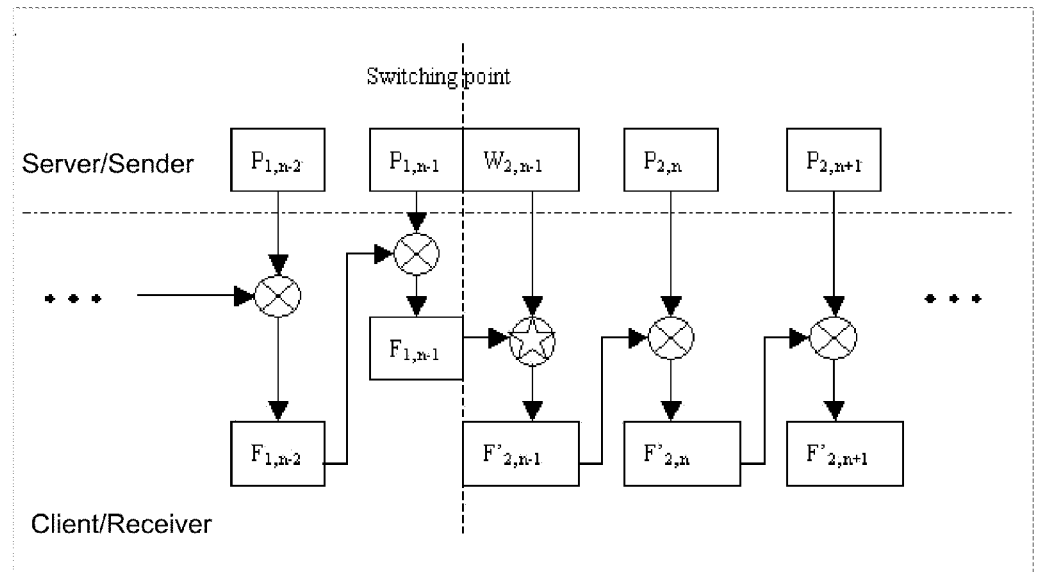
FIG. 4 shows a first exemplary Wyner-Ziv bitstream-switching scheme for multiple bit rate video streaming, according to one embodiment.

FIG. 4 shows a first exemplary Wyner-Ziv bitstream-switching scheme for multiple bit rate video streaming, according to one embodiment. Referring to FIG. 4, the symbol "☆" denotes that Wyner-Ziv decoder 128 of FIG. 1 takes $F_{1,n-1}$ as side information, and the symbol "X" denotes motion-compensated prediction operations that are implemented at decoder 128 based on motion compensation correlation operations implemented at encoder 116. Suppose $P_{k,n}$ (k=1, 2) represents coded bits of frame n in bitstream k. Further, suppose $F_{k,n}$ (k=1, 2) indicates the reconstructed frame in bitstream k at decoder 128 (FIG. 1). Assume that server 102 initially sends bitstream 1 (encoded media content 126) up to time n and then turns to bitstream 2 (encoded media content 126) due to the variance of bandwidth.

Decoder 128 reconstructs frame $F_{2,i}$ using a Wyner-Ziv methodology. The Wyner-Ziv coded parity bits (i.e., side stream) associated with of bitstream 2 are denoted as $W_{2,i}$. When the bit-streaming operations arrive at the switching point, encoder 116 (or a video streaming application that leverages output of encoder 116) transmits $P_{1,n-1}$. Then decoder 128 reconstructs $F_{1,n-1}$ using $F_{1,n-2}$ as the reference frame. Subsequently, $W_{2,n-1}$ are transmitted to inform decoder 128 for the purpose of switching. Decoder 128 decodes $W_{2,n-1}$ using $F_{1,n-1}$ as the side information. The decoded frame (a bitstream transition frame) $F'_{2,n-1}$ should be identical or very close to $F_{2,n-1}$ depending on the quantization step-size in the Wyner-Ziv coding. Following this, encoder 116 transmits subsequent frames $P_{2,n}$, $P_{2,n+1}$, ... to decoder 128. In summary, in this first exemplary scheme for bitstream switching, encoder 116 transmits $W_{2,n-1}$ and $P_{2,n}$ in total at the switching point to decoder 128. Wyner-Ziv coding is used only at a switching point (E.g., switching occurs at time n, and therefore, conventional encoding and decoding is used until $P_{1,n-1}$).

Since bitstream 1 is encoded at a lower rate than bitstream 2, the described switch operation represents up-switching from a lower bit rate to a higher bit rate. Wyner-Ziv bits of bitstream 1 (i.e., the parity bits generated by encoder 116) are not needed for up switching.

A Second Exemplary Bitstream Switching Scheme

Figure 5:
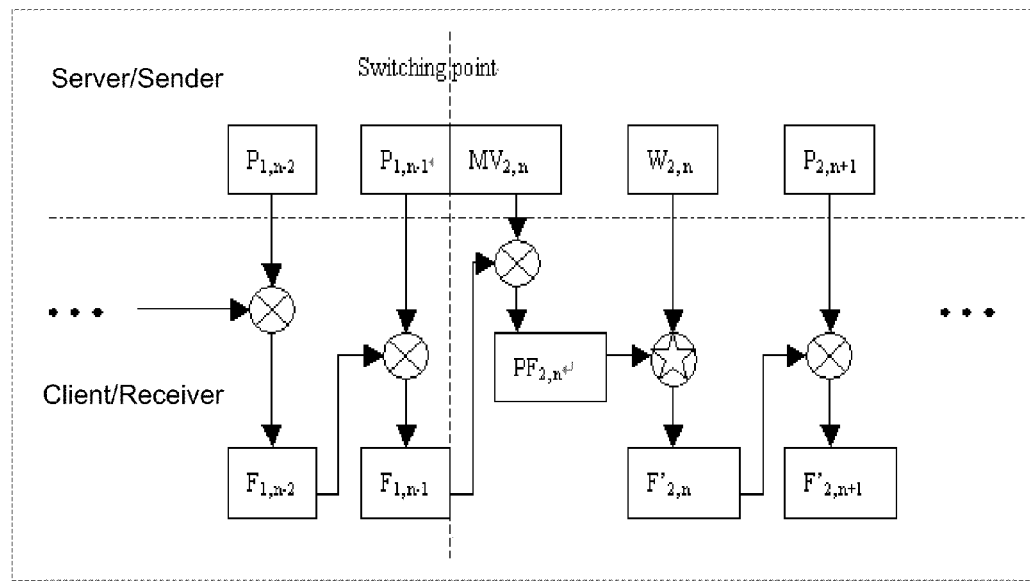
FIG. 5 shows a second exemplary Wyner-Ziv bitstream-switching scheme for multiple bit rate video streaming, according to one embodiment.

FIG. 5 shows a second exemplary Wyner-Ziv bitstream-switching scheme for multiple bit rate video streaming, according to one embodiment. In the first exemplary bitstream switching scheme, which was described in reference to FIG. 4, encoder 116 transmits entire frame $P_{2,n}$ when switching occurs at time n. In contrast to the first switching scheme, encoder 116 transmits only part of $P_{2,n}$ in this second bitstream switching scheme. More particularly, the motion information (i.e. $MV_{2,n}$) and intra-coded blocks of $P_{2,n}$ are transmitted to decoder 128. Thus, the prediction of $F_{2,n}$, namely $PF_{2,n}$, is generated using the decoded motion vectors, the decoded intra blocks and the reconstructed previous frame $F_{1,n-1}$. Then, encoder 116 transmits $W_{2,n}$. Decoder 128 decodes $W_{2,n}$ using $PF_{2,n}$ as side information. In this way, the decoded frame $F'_{2,n}$ can be very close to $F_{2,n}$, depending on quantization step-size in Wyner-Ziv coding. The remaining operations in the second bitstream switching scheme are similar to those described above respect to the first bitstream switching scheme. In summary, encoder 116 transmits $W_{2,n-1}$, and part Of $P_{2,n}$ at the switching point.

Exemplary Procedures

A First Exemplary Bitstream Switching Approach

Figure 6:
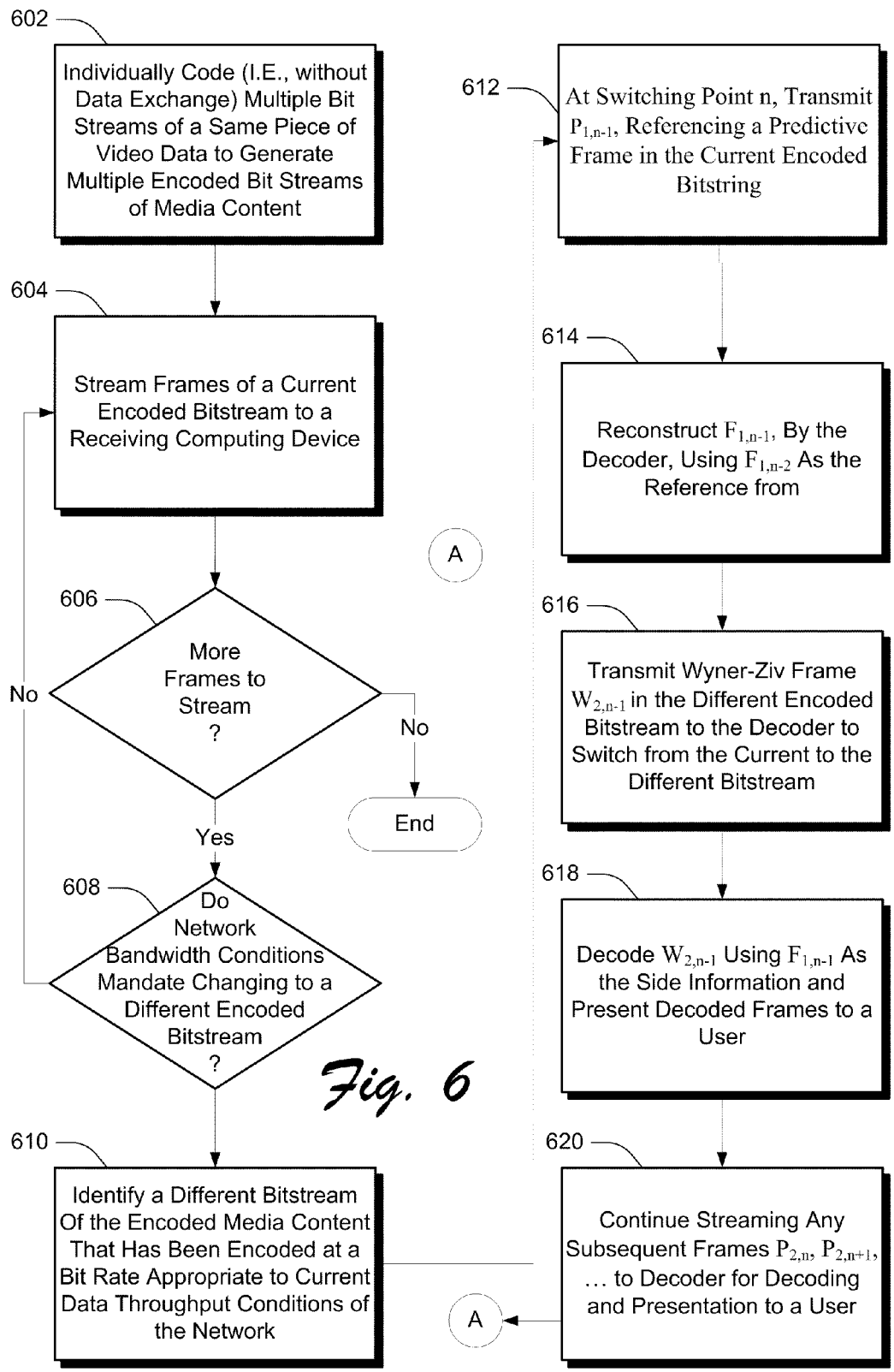
FIG. 6 shows one exemplary procedure for bitstream switching in MBR video streaming environments, according to one embodiment.

FIG. 6 shows an exemplary procedure 600 describing bitstream switching in MBR video streaming environments, according to one embodiment. For purposes of discussion, the operations of FIG. 6 are described in reference to components of FIG. 1. For instance, in the description, the left-most digit of a component reference number identifies the particular Figure in which the component first appears. In one implementation encoder 116 and/or a streaming application that leverages operations of encoder 116 implements operations of procedure 600. Additionally, for purposes of exemplary illustration and description, frames associated with a current bitstream (i.e., an encoded bitstream currently being streamed to a remote computing device) are identified in the following description of procedure 600 with the subscript of "1". In contrast, frames associated with a different bitstream (i.e., an encoded bitstream that will be switched in to replace the current bitstream) are identified with the subscript "2". When the current bitstream is switched out to the different bitstream, the different bitstream becomes the current bitstream.

Referring to FIG. 6, at block 602, encoder 116 individually codes (i.e., without data exchange) multiple bitstreams of a same piece of video data 120 to generate multiple bitstreams of encoded media content 126. Each encoded bitstream is encoded at a different bit rate independent of data exchange. Encoded media content 126 includes bitstreams of media content encoded with the first decoder such as a H.264 encoder and bitstreams of Wyner-Ziv encoded media content. At block 604, encoder 116 (or a streaming application that leverages output of encoder 116) transmits a first (current) encoded bitstream (a bitstream of encoded media content 126) to a remote computing device 106 for decoding and presentation to a user. At block 606, the procedure determines whether there are more frames of the current encoded bitstream to stream to the remote computing device. If not, the operations of procedure 600 are complete. Otherwise, operations of procedure 600 continue at block 608.

At block 608, procedure 600 evaluates network bandwidth throughput conditions to determine whether the current encoded bitstream should be switched out with a different encoded bitstream to maintain a high quality video presentation experience to the user. If not, operations continue at block 604. Otherwise, operations of procedure 600 continue at block 610, wherein a different bitstream (a respective bitstream of encoded media content 126) that encoder 1 1 6 encoded at a bit-rate appropriate with the current data throughput characteristics of network 104 is identified. At block 612, when the switching point at time n arrives, procedure 600 transmits $P_{1,n-1}$, referencing a predictive frame in the current bitstream. At block 614, responsive to receiving $P_{1,n-1}$, decoder 128 reconstructs $F_{1,n-1}$ using $F_{1,n-2}$ as the reference frame. At block 616, procedure 600 transmits frame $W_{1,n-1}$, referencing a Wyner-Ziv frame (i.e., entire frame $P_{2,n}$) in the second encoded bitstream, to decoder 128 to switch from the first to the second bitstream. At block 618, responsive to receiving $W_{2,n-1}$, decoder 128 decodes $W_{2,n-1}$ using $F_{1,n-1}$ as the side information. At block 620, subsequent frames of the different encoded (e.g., $P_{2,n}$, $P_{2,n+1}$, ...) are streamed to decoder 128 for decoding and presentation to a user.

A Second Exemplary Bitstream Switching Approach

Figure 7:
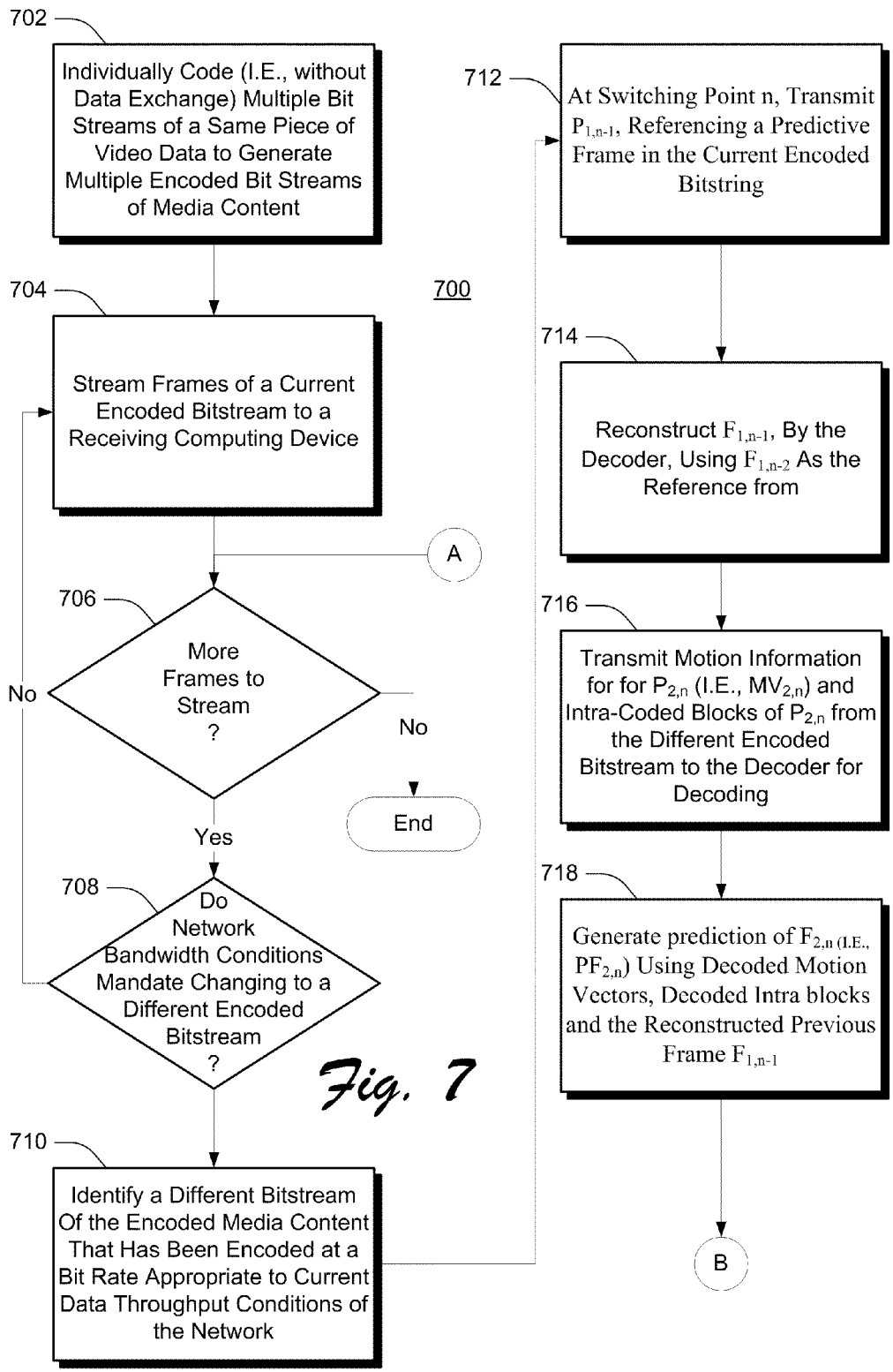
FIG. 7 shows another exemplary procedure for bitstream switching in MBR video streaming applications, according to one embodiment.

FIG. 7 shows another exemplary procedure 700 for bitstream switching in MBR video streaming applications, according to one embodiment. For purposes of discussion, the operations of FIG. 7 are described in reference to components of FIG. 1. In one implementation encoder 116 and/or a streaming application that leverages operations of encoder 116 implements operations of procedure 600. Analogous to the description of FIG. 6, frames associated with a current bitstream (i.e., an encoded bitstream currently being streamed to a remote computing device) are identified in the following description of procedure 700 with the subscript of "1". In contrast, frames associated with a different bitstream (i.e., an encoded bitstream that will be switched in to replace the current bitstream) are identified with the subscript "2". When the current bitstream is switched out to the different bitstream, the different bitstream becomes the current bitstream.

Referring to FIG. 7, at block 702, encoder 116 individually codes (i.e., without data exchange) multiple bitstreams of a same piece of video data 120 to generate multiple bitstreams of encoded media content 126 (including bitstreams of media content encoded with the first decoder such as a H.264 encoder and bitstreams of Wyner-Ziv encoded media content). Each encoded bitstream is encoded at a different bit rate independent of data exchange. At block 704, encoder 116 (or a streaming application that leverages output of encoder 116) transmits a first (current) encoded bitstream (a bitstream of encoded media content 126) to a remote computing device 106 for decoding and presentation to a user. At block 706, the procedure determines whether there are more frames of the current encoded bitstream to stream to the remote computing device. If not, the operations of procedure 700 are complete. Otherwise, operations of procedure 700 continue at block 708.

At block 708, procedure 700 evaluates network bandwidth throughput conditions to determine whether the current encoded bitstream should be switched out with a different encoded bitstream to maintain a high quality video presentation experience to the user. If not, operations continue at block 704. Otherwise, operations of procedure 700 continue at block 710 wherein a different bitstream (a respective bitstream of encoded media content 126) that encoder 116 encoded at a bit-rate appropriate with the current data throughput characteristics of network 104 is identified. At block 712, when the switching point at time n arrives, procedure 700 transmits $P_{1,n-1}$, referencing a predictive frame in the current bitstream. At block 714, responsive to receiving $P_{1,n-1}$, decoder 128 reconstructs $F_{1,n-1}$ using $F_{1,n-2}$ as the reference frame.

In the exemplary bitstream switching scheme described above in reference to FIGS. 4 and 6, an entire frame $P_{2,n}$ is communicated to decoder 128 when switching occurs at time n. In contrast, in this embodiment of procedure 700, only part of $P_{2,n}$ is transmitted to decoder 128. More particularly, at block 716, procedure 700 transmits motion information (i.e., $MV_{2,n}$) and intra-coded blocks of $P_{2,n}$ to decoder 128. At block 718, decoder 128 generates the prediction of $F_{2,n}$, namely $PF_{2,n}$, using decoded motion vectors, decoded intra blocks and the reconstructed previous frame $F_{1,n-1}$. At this point, procedure 700 continues at block 802 of FIG. 8, and is shown by on page reference "B".

Figure 8:
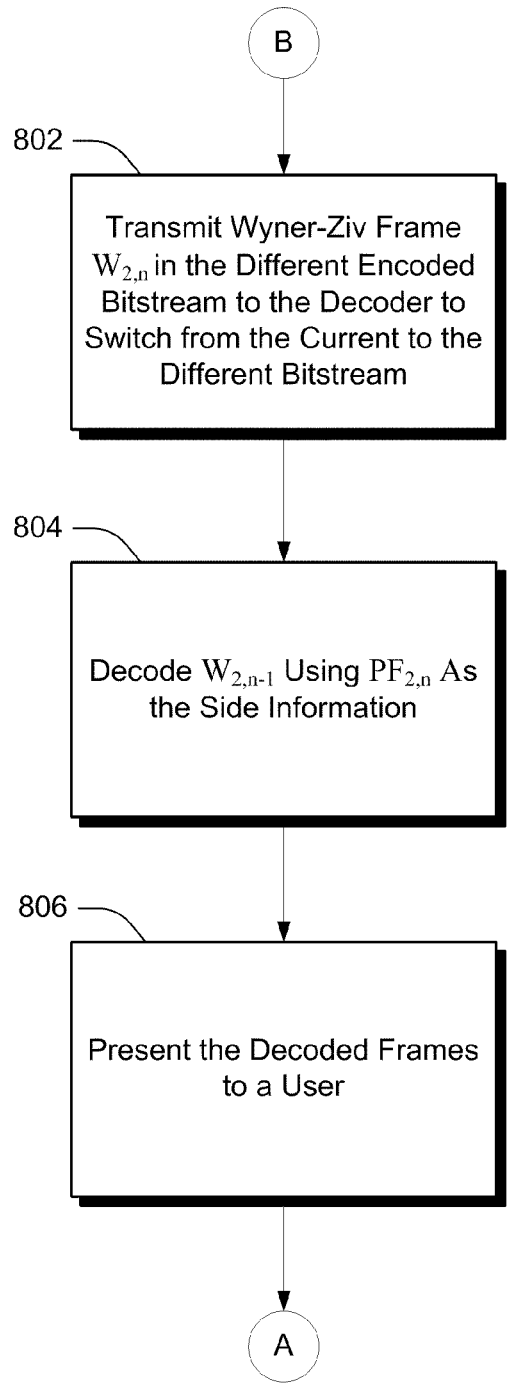
FIG. 8 shows further exemplary aspects of the procedure of FIG. 7 for bitstream switching in MBR video streaming applications, according to one embodiment.

FIG. 8 shows further exemplary of the exemplary procedure of FIG. 7 for bitstream switching in MBR video streaming applications, according to one embodiment. At block 802, procedure transmits Wyner-Ziv frame $W_{2,n}$ to decoder 128. At block 804, decoder 128 decodes $W_{2,n}$ using $PF_{2,n}$ as side information. This provides a decoded frame $F'_{2,n}$ that is very similar to $F_{2,n}$, depending on quantization step-size in Wyner-Ziv coding. At this point, the different bitstream is now the current bitstream with respect to the operations of FIGS. 7 and 8. At block 806, the decoded frame(s) are presented to a user. Procedure 700 continues at block 706 of FIG. 7 as shown by on-page reference "A", wherein subsequent frames of the current encoded bitstream (e.g., $P_{2,n}$, $P_{2,n+1}$, . . . ) are streamed to decoder 128 for decoding and presentation to a user.

CONCLUSION

Although bitstream switching in MBR video streaming environments has been described in language specific to structural features and/or methodological operations or actions, it is understood that the implementations defined in the appended claims are not necessarily limited to the specific features or actions described. Rather, the specific features and operations discussed above with respect to FIGS. 1-8 are disclosed as exemplary forms of implementing the claimed subject matter.

The invention claimed is:

1. A method comprising: generating, by a computing device using a first encoding algorithm, multiple encoded bitstreams of a same piece of video content, each encoded bitstream of the encoded bitstreams being encoded at a different bit rate; creating, by the computing device using a second encoding algorithm that is different than the first encoding algorithm, multiple encoded side bitstreams of the same piece of video content, each encoded side bitstream being encoded at a different bit rate and including switching frames generated from frames of the same piece of video content and corresponding to frames of respective ones of the multiple encoded bitstreams, and the second encoding algorithm being a Wyner-Ziv encoding algorithm; streaming, by the computing device and at non-bitstream switching points, frames from an encoded bitstream generated with the first encoding algorithm to a client; switching, by the computing device and at a bitstream switching point, from the encoded bitstream to a different bitstream of the multiple encoded bitstreams by: streaming a switching frame from a side bitstream encoded with the second algorithm to the client, the switching frame corresponding to a frame in the different bitstream, and the switching frame including a partial amount of parity bits that is sufficient to correct errors in the multiple encoded side bitstreams using a request-bits feedback loop; and streaming at least a portion of a frame from the bitstream switching point from the different bitstream and subsequent frames from the different bitstream to the client; and wherein receipt by the client of frames from the encoded bitstream, the switching frame, and frames from the different bitstream causes the client to reconstruct respective frames of the same piece of video content for presentation to a user.

2. The method of claim 1, wherein the first encoding algorithm is an H.264 encoding algorithm.

3. The method of claim 1, wherein receipt of at least the switching frame provides the client with information to construct a bitstream transition frame, the bitstream transition frame representing a first reconstructed frame from the different bitstream to be presented to the user.

4. The method of claim 1, wherein the switching includes switching from a bitstream encoded at a first bit rate to a second bitstream encoded at a second bit rate that is greater than the first bit rate.

5. The method of claim 1, wherein the switching includes switching from a bitstream encoded at a first bit rate to a second bitstream encoded at a second bit rate that is less than the first bit rate.

6. The method of claim 1, wherein the frames from the encoded bitstream are for decoding by a first decoding algorithm, the switching frame is for decoding by a second decoding algorithm that is different from the first decoding algorithm, and frames from the different bitstream are for decoding by the first decoding algorithm.

7. The method of claim 1:
wherein the switching frame represents parity bits from a frame at time n−1 in a timeline of the same piece of video content, the switching frame being encoded at a same bit rate used to generate the different bitstream, n being the bitstream switching point; and wherein a bitstream transition frame is generated by the client from information provided by a reconstructed reference frame corresponding to time n−1 of the first bitstream and the switching frame.

8. The method of claim 1:
wherein the switching frame represents parity bits from a frame at time n in a timeline of the same piece of video content, the switching frame being encoded at a same bit rate used to generate the different bitstream, n being the bitstream switching point;
wherein the at least a portion is motion compensation information of the frame from time n from the different bitstream; and
wherein the respective frames comprise a transition frame to transition presentation of frames decoded from the encoded bitstream to frames decoded from the different bitstream, the transition frame being generated based on motion vector information, a reconstructed previous frame associated with time n−1 in the first bitstream, and decoded intra blocks of a frame associated with time n in the second bitstream, n being the bitstream switching point.

9. The method of claim 1, wherein switching from the encoded bitstream to a different bitstream is performed responsive to detecting network data throughput bandwidth conditions incompatible with a bit rate used to encode the encoded bitstream and compatible with a bit rate used to encode the different bitstream.

10. A system comprising:
one or more processors; and
memory that stores computer-executable instructions that, when executed by the one or more processors, cause the one or more processors to perform operations comprising:
receiving a set of frames associated with a current bitstream;
decoding the frames with a first decoding algorithm for presentation to a user;
receiving, at a switching point n, a switching frame generated from a piece of video content encoded at a different bit rate than the current bitstream;
responsive to receiving the switching frame:
decoding the switching frame to generate a transition frame, the decoding being performed with a second decoding algorithm using at least a reconstructed frame as side information, the reconstructed frame corresponding to a frame from the current bitstream, the second decoding algorithm being a Wyner-Ziv encoding algorithm and being different than the first decoding algorithm, and the switching frame including a partial amount of parity bits that is configured to correct errors in the transition frame in order to generate a reference frame; and
presenting the transition frame to the user; and
receiving a set of frames from a different bitstream for decoding using the first decoding algorithm and subsequent presentation to the user.

11. The system of claim 10, wherein the first decoding algorithm is an H.264 encoding algorithm.

12. The system of claim 10, wherein receipt of the switching frame provides information to construct a bitstream transition frame, the bitstream transition frame representing a first reconstructed frame from the different bitstream to be presented to the user.

13. The system of claim 10, wherein the operations further comprise:
receiving only motion compensation information for a frame of the different bitstream, the frame corresponding to frame of the piece of video content at time n,
wherein the motion compensation information and the switching frame in view of the reconstructed frame provides information to construct a bitstream transition frame for presentation to the user when transitioning between the current bitstream and the different bitstream.

14. The system of claim 10, wherein the switching frame represents parity bits from a frame at time n−1 in a timeline of the piece of video content, the switching frame being encoded at a same bit rate used to generate the different bitstream.

15. The system of claim 10, wherein the switching frame represents parity bits from a frame at time n in a timeline of the same piece of video content, the switching frame being encoded at a same bit rate used to generate the different bitstream.

16. The system of claim 10, wherein switching from the current bitstream to a different bitstream is performed responsive to detecting network data throughput bandwidth conditions incompatible with a bit rate used to encode the current bitstream and compatible with a bit rate used to encode the different bitstream.

17. A computing device comprising:
a processor; and
a memory coupled to the processor, the memory comprising computer-program instructions executable by the processor for:
encoding, using Wyner-Ziv encoding, video content to generate a bitstream of switching frames at a particular bit rate;
encoding, using an encoding algorithm different from Wyner-Ziv, frames of the video content at the particular bit rate and at a different bit rate;
streaming frames encoded at the different bit rate for decoding and presentation to a user;
determining that network conditions are incompatible with streaming the frames but compatible with frames encoded at the particular bit rate;
responsive to the determining:
transmitting, at a switching point, a switching frame from the bitstream of switching frames for reconstructing a first frame from frames encoded at the particular bit rate with a non-Wyner-Ziv encoding, the first frame for presentation to the user, and the switching frame including a partial amount of parity bits that is sufficient to correct errors in the bitstream of switching frames; and
streaming respective ones of the frames encoded at the particular bit rate with the non-Wyner-Ziv encoding for presentation to the user, the frames being at least subsequent in a video presentation timeline to the switching point.

18. The computing device of claim 17, wherein the encoding algorithm different from Wyner-Ziv is an H.264 encoding algorithm.

* * * * *